United States Patent
Galdos et al.

(10) Patent No.: US 9,810,710 B2
(45) Date of Patent: Nov. 7, 2017

(54) VIBRATION SENSOR

(71) Applicant: ETEL S.A., Môtiers (CH)

(72) Inventors: Gorka Galdos, Yverdon-les-bains (CH); Philippe Tamigniaux, Morteau (FR); Jean-Pierre Morel, Les Fourgs (FR); Walter Kranitzky, Traunstein (DE)

(73) Assignee: ETEL S.A., Môtiers (CH)

( * ) Notice: Subject to any disclaimer, the term of this patent is extended or adjusted under 35 U.S.C. 154(b) by 252 days.

(21) Appl. No.: 14/713,247

(22) Filed: May 15, 2015

(65) Prior Publication Data

US 2015/0331009 A1 Nov. 19, 2015

(30) Foreign Application Priority Data

May 15, 2014 (EP) .................................... 14168384

(51) Int. Cl.
| | |
|---|---|
| *F16F 15/02* | (2006.01) |
| *G01P 15/093* | (2006.01) |
| *G01H 1/00* | (2006.01) |
| *G01P 15/03* | (2006.01) |
| *B23Q 17/12* | (2006.01) |
| *G01P 1/00* | (2006.01) |

(52) U.S. Cl.
CPC ............ *G01P 15/032* (2013.01); *B23Q 17/12* (2013.01); *F16F 15/02* (2013.01); *G01H 1/00* (2013.01); *G01P 15/093* (2013.01); *G01P 1/003* (2013.01)

(58) Field of Classification Search
CPC ...... G01P 15/032; G01P 15/093; G01P 1/003; G01H 1/00; F16F 15/02; B23Q 17/12

USPC .......................................................... 73/652
See application file for complete search history.

(56) References Cited

U.S. PATENT DOCUMENTS

| | | | | |
|---|---|---|---|---|
| 6,079,267 | A | * | 6/2000 | Hull .................... F16C 32/0438 310/90.5 |
| 6,473,187 | B1 | | 10/2002 | Manalis |
| 6,493,952 | B1 | * | 12/2002 | Kousek ................ G01C 15/004 33/286 |
| 6,694,812 | B2 | * | 2/2004 | Loetzner ................. G01M 1/32 73/462 |

(Continued)

FOREIGN PATENT DOCUMENTS

| | | | |
|---|---|---|---|
| CN | 2643296 | * | 9/2004 |
| EP | 2 075 484 | | 7/2009 |

(Continued)

OTHER PUBLICATIONS

A. Ernst, "Digital Linear and Angular Metrology—Position Feedback for Machine Manufacture and the Electronics Industry", 1998, p. 5.

*Primary Examiner* — J M Saint Surin
(74) *Attorney, Agent, or Firm* — Andrews Kurth Kenyon LLP

(57) ABSTRACT

A vibration sensor includes a mass block supported with the aid of at least one spring in a manner allowing movement relative to a frame in a measuring direction, a displacement of the mass block in the measuring direction relative to the frame being detectable by a position-measuring device. The position-measuring device includes a measuring standard and a scanning head aligned with the measuring standard. One of these two components is secured on the mass block, and the other is secured on the frame.

15 Claims, 3 Drawing Sheets

(56) References Cited

U.S. PATENT DOCUMENTS

| | | | |
|---|---|---|---|
| 2002/0190592 A1* | 12/2002 | Kawasaki | B64G 1/32 |
| | | | 310/90.5 |
| 2004/0060355 A1 | 4/2004 | Nemirovsky et al. | |
| 2007/0062284 A1 | 3/2007 | Machida | |
| 2007/0131830 A1* | 6/2007 | Brennan | F16F 15/035 |
| | | | 248/206.5 |
| 2007/0165907 A1 | 7/2007 | Schroeder et al. | |
| 2007/0261489 A1 | 11/2007 | Murelitharan | |
| 2011/0127400 A1 | 6/2011 | Kastelijn et al. | |
| 2012/0050735 A1 | 3/2012 | Higgins et al. | |

FOREIGN PATENT DOCUMENTS

| | | |
|---|---|---|
| EP | 2 719 499 | 4/2014 |
| JP | 2003-107104 | 4/2003 |

* cited by examiner

VIBRATION SENSOR

CROSS-REFERENCE TO RELATED APPLICATIONS

The present application claims priority to application Ser. No. 14/168,384.7, filed in the European Patent Office on May 15, 2014, which is expressly incorporated herein in its entirety by reference thereto.

FIELD OF THE INVENTION

The present invention relates to a vibration sensor.

BACKGROUND INFORMATION

Vibration sensors play a role in many areas of technology. For example, systems for active vibration isolation are based on a vibration measurement, which only makes it possible to actively damp unwanted vibrations. A further field of application for vibration sensors is ascertaining the imbalance of rotating shafts, e.g., in machine tools.

One use of vibration sensors is described in European Published Patent Application No. 2 719 499, according to which, the imbalance of a rotating shaft of a machine tool is monitored with the aid of a vibration sensor that is disposed on the stationary part of a machining center having rotating shafts. Other placements of the vibration sensor, for instance, directly on a rotary table, are also discussed in the introduction thereof.

In the technical field of active vibration isolation, for which a good overview is provided in European Published Patent Application No. 2 075 484, what are referred to as geophones are often used in conventional methods. Basically, they are sensors in which a flexibly supported magnet as a test mass is caused to vibrate by external excitation. In response, coils in the vicinity of the magnet output a voltage signal proportional to she speed. Such inductive sensors have the disadvantage, however, that the signal-to-noise ratio at low vibrational frequencies becomes small, because low frequency means a slow movement of the magnet relative to the coil, and therefore only a small induced voltage. Geophones for she exact detection of vibrations below 4 Hz are obtainable only with great difficulty. However, the natural frequencies of platforms on which moving devices are arranged are also on this order of magnitude, and to the greatest extent possible, the platforms should not be stimulated to vibrate, either due to external influences such as a vibrating foundation, or by internal excitation due to the moving device itself. Systems for active vibration isolation therefore measure the vibrations of the platform and attenuate them actively, e.g., with the aid of actuators which act between the platform and the foundation.

European Published Patent application No. 2 075 484, for example, describes, instead of using inductive speed sensors susceptible to noise, using position-measuring devices which are able to detect the movement of a test mass even in the case of very slow movements, without additional noise occurring in the process. A position-measuring device is also able to detect the excursion of a test mass in the case of very slow movements at any time (even during standstill), so that low frequencies do not affect the signal-to-noise ratio detrimentally.

U.S. Pat. No. 6,473,187 describes a vibration sensor having a mass block which is supported with the aid of a leaf spring in a manner allowing movement, relative to a frame in a measuring direction, a displacement of the mass block relative to the frame being detectable by a position-measuring device. Disposed on the mass block and on the frame are fingers intermeshing in comb-like fashion, which together result in an evenly-spaced optical diffraction grating at which light from a light source is reflected into different orders of diffraction and is then detected by a detector. In response to an excursion of the proof mass, the effective period of the grating, and therefore the distribution of the light into the various orders of diffraction, changes. Consequently, it is possible to infer the excursion of the proof mass from the detector signals. However, the finger-like and self-supporting structures acting as an optical diffraction grating are not easy to produce, and the grating periods of less than one micrometer customary especially for a highly accurate position measurement cannot be achieved with such structures.

Commercially available position-measuring devices, which are described in detail, for example, in the reference book "Digital Linear and Angular Metrology," Moderne Industrie Publishing House, Landsberg/Lech, 1998, have a measuring standard with fine periodic structures that are scanned by a scanning head moved relative to the measuring standard. For example, the periodic structures are able to modulate the reflectivity, which may be scanned with the aid of light. In that context, measuring standards having graduation periods of less than one micrometer are already being used. By the use of interferential scanning using monochromatic light and further subdivision of the periodic detector signals by interpolation, it is possible to determine position changes in the nanometer range.

SUMMARY

Example embodiments of the present invention provide an optimized vibration sensor which permits very good detection of vibrations at low excitation frequencies.

According to an example embodiment of the present invention, a vibration sensor includes a mass block which is supported with the aid of at least one spring in a manner allowing movement, relative to a frame in a measuring direction, a displacement of the mass block, relative to the frame being detectable by a position-measuring device. The position-measuring device includes a measuring standard and a scanning head aligned with the measuring standard. One of these two components is secured on the mass block, and the other is secured on the frame.

It is considered advantageous to integrate a position-measuring device, available as a standard component, into the vibration sensor. Thus, position-measuring devices having the highest resolution are available, which may be purposefully selected in accordance with the accuracy needed and incorporated into the vibration sensor. Separate development and optimization of the scanning principle of the position-measuring device, as in conventional systems, is not necessary. In addition, such position-measuring devices have standardized interfaces, so that the development expenditure for sequential electronics turns out to be lower, as well.

This holds true for the especially advantageous use of such vibration sensors for the active vibration damping of a platform, where the measured vibration serves as starting point for the control of actuators that counteract the unwanted vibrations.

The standardized interface is also applicable for practical applications where the vibration sensor is used to ascertain the imbalance of rotating shafts on numerically controlled machine tools. Numerical controls for such machine tools have numerous inputs for the connection of position-measuring devices, so that such a vibration sensor may be put into operation very easily.

The mechanical transfer function of such vibration sensors may be adapted to the specific application case using various measures. Thus, for the mass block used as a test mass, an eddy-current braking may be integrated to suppress vibration. If the at least one leaf spring retaining the mass block in a manner allowing movement is preloaded by the weight force of the mass block, by using additional magnets in the vibration sensor, forces may be set which counteract this weight force or even compensate for it completely.

Further features and aspects of example embodiments of the present invention are described in more detail below with reference to the appended Figures.

DETAILED DESCRIPTION

Figure 1:
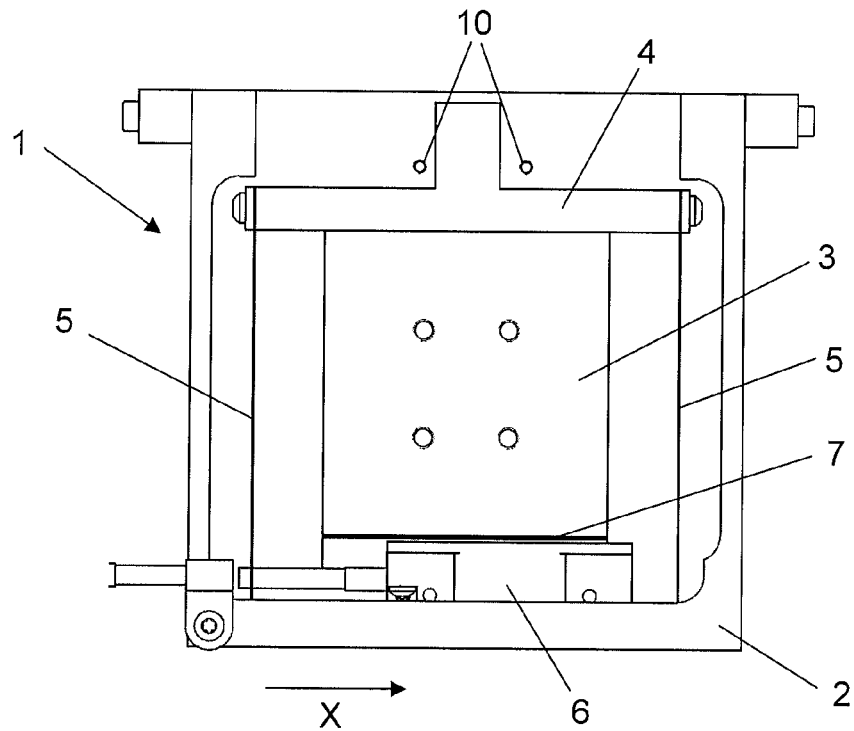
FIGS. 1 to 4 illustrate a vibration sensor according to a first exemplary embodiment of the present invention.
Figure 2:
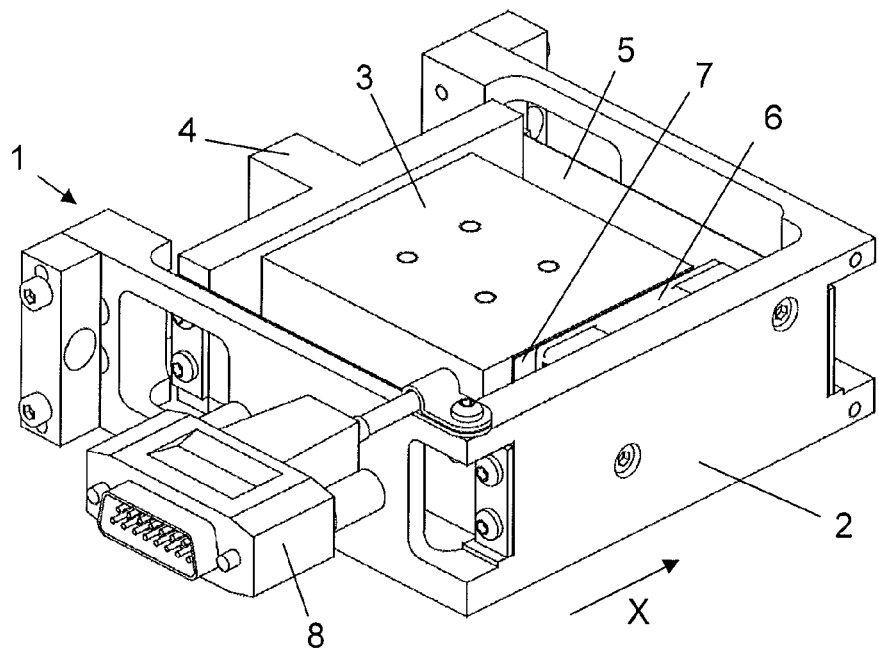

FIGS. 1 to 4 illustrate a first exemplary embodiment of a vibration sensor 1, which is suitable primarily for horizontal installation, e.g., for a vibration sensor that measures vibrations in a horizontal measuring direction X. It has a sturdy rectangular frame 2, on and in which the components of vibration sensor 1 are disposed and aligned relative to each other.

A cuboidal mass block 3 is used as a test mass for vibration sensor 1, and is secured to the frame by a T-shaped mount 4 and two leaf springs 5. Mass block 3 is joined firmly to mount 4. Leaf springs 5 are secured to limbs of mount 4 projecting laterally beyond mass block 3. Leaf springs 5 block all degrees of freedom of mass block 3 except for a movement in measuring direction X.

For accelerations having a frequency close to 0 Hz, the following applies: an acceleration of vibration sensor 1 in measuring direction X produces a force proportional to the acceleration and the inertial mass of mass block 3, this force bending leaf springs 5 and displacing mass block 3 in measuring direction X. Since the mass of mass block 3 is invariable, and Hooke's law is in effect for small excursions of the mass block, the excursion of mass block 3 in measuring direction X is directly proportional to the acceleration.

If vibration sensor 1 is installed horizontally, leaf springs 5 are subjected to pressure in their longitudinal direction, e.g., they are compressed by the weight of mass block 3. Their modulus of elasticity thereby changes. Compared to a leaf spring which is not compressed, a compressed leaf spring becomes softer. If this vibration sensor 1 is installed so as to be rotated by 180 degrees, with the result that the weight force of mass block 3 pulls on leaf springs 5 instead of compressing them, the resonant frequency of vibration sensor 1 then changes. This change of the mechanical properties-due to a change in the installed position of the vibration sensor must be taken into account. This will also be discussed in the second exemplary embodiment, which explains a vibration sensor particularly suitable for vertical installation (for the measurement of vertical vibrations).

A measuring standard 7 is placed on mass block 3 opposite mount 4. For example, measuring standard 7 may be a short piece of a measuring tape or a divided rule of a position-measuring device that bears a graduation structure having as fine a period as possible along measuring direction X, and that is glued onto mass block 3. Alternatively, the measuring standard may be applied directly onto mass block 3 by writing a periodic line grating on mass block 3 using lithographic processes, for instance.

A scanning head 6 for the optical scanning of measuring standard 7 with the aid of light, is joined to frame 2 and disposed opposite measuring standard 7. However, all other scanning principles for measuring standards are also suitable, just so long as they provide for sufficient accuracy. Magnetic, inductive, and/or capacitive scanning principles and their corresponding measuring standards may be provided.

If mass block. 3, and with it, measuring standard 7, is displaced by a vibration applied from outside, this is able to be detected by scanning head 6. Scanning head 6 usually generates a plurality or periodic signals phase-shifted relative to each other, whose periodicity is proportional to the displacement, and from whose phase relation, it is possible to infer the direction of movement.

The electric signals obtained by scanning head 6 may be transmitted via a plug connector 8 to sequential electronics and evaluated there. Alternatively, a displacement may be calculated directly in the scanning head and transmitted as a digital value to the sequential electronics. There, the vibration in measuring direction X may be ascertained from the displacement.

Vibration sensor 1 measures the vibrations of a platform on which vibration sensor 1 is mounted, and whose vibrations are to be actively damped. Care must therefore be taken that the system, which includes mass block 3 and leaf springs 5, which itself is a vibratory system having a specific natural frequency, is also actually able to correctly represent the vibrations to be measured in the frequency range of interest. The transfer function is important for this, with which excitations of a specific frequency are converted into measured values of vibration sensor 1.

The mass of mass block 3, the dimensioning of leaf springs 5, and their preloading in the longitudinal direction are parameters with which the natural frequency of vibration sensor 1 may be influenced toward the lowest possible frequencies. The transfer function of vibration sensor 1 may be measured, in order to take this transfer function into account with the aid of what is referred to as a stretching filter. In this context, the most linear transfer function possible is attained even at low frequencies below the natural frequency of vibration sensor 1, by additionally multiplying the sensor signals with the inverse transfer function of vibration sensor 1. Thus, using a vibration sensor of the type described here having a natural frequency of, e.g., 2 Hz, in addition, vibrations down to, e.g., approximately 0.4 Hz, are able to be measured with a good signal-to-noise ratio.

The measurement of the transfer function (also called identification) is especially precise if the vibrations of the mass/spring system are attenuated. Therefore, vibration sensor 1 has a vibration damping system which acts on mass block 3. To that end, mounted on mass block 3 are flat damping magnets 9, whose field lines penetrate the electrically conductive back wall of frame 2 made of aluminum, for example. A movement of mass block 3 relative to frame 2 produces eddy currents in the back wall of frame 2, which counteract the movements of mass block 3 and suppress them. Magnets 9 are disposed with alternating polarity, so that no magnetic fields are effective at some distance from vibration sensor 1.

A mass of 0.7 kg for mass block 3, and leaf springs having the dimensions 70×22×0.2 mm, as well as a modulus of elasticity of 210e9 N/m² are among example for the dimensioning of a vibration sensor 1. The damping by the eddy-current braking should amount to, e.g., approximately 2 Ns/m. A vibration sensor 1 constructed in this manner has a natural frequency of, e.g., approximately 0.8 Hz.

Figure 3:
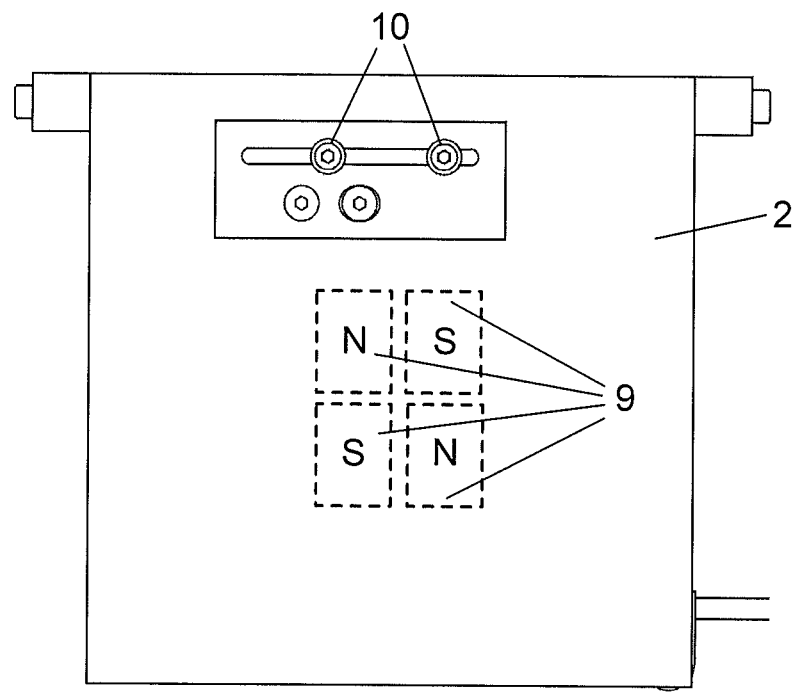
Figure 4:
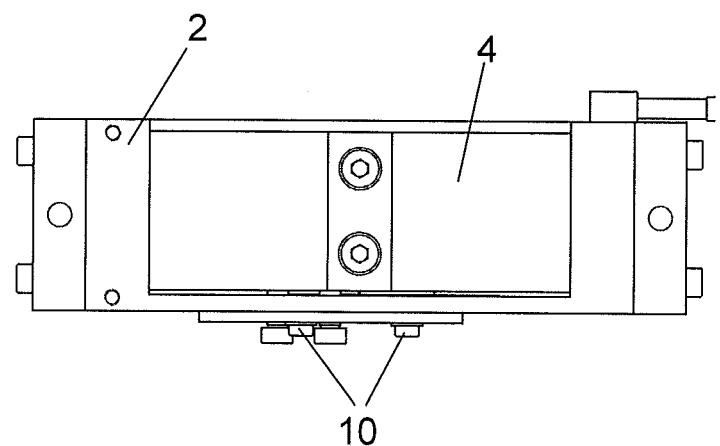

FIG. 3 illustrates screws 10 in the back wall of frame 2, that project into the interior of frame 2 and lie in measuring direction X on both sides of one limb of T-shaped mount. 4, which is illustrated, for example, in FIG. 1. They are used as limit stops for mount 4, and therefore limit the excursion of mass block 3. Damage to vibration sensor 1 due to excursions which are too great may thus be avoided.

Figure 5:
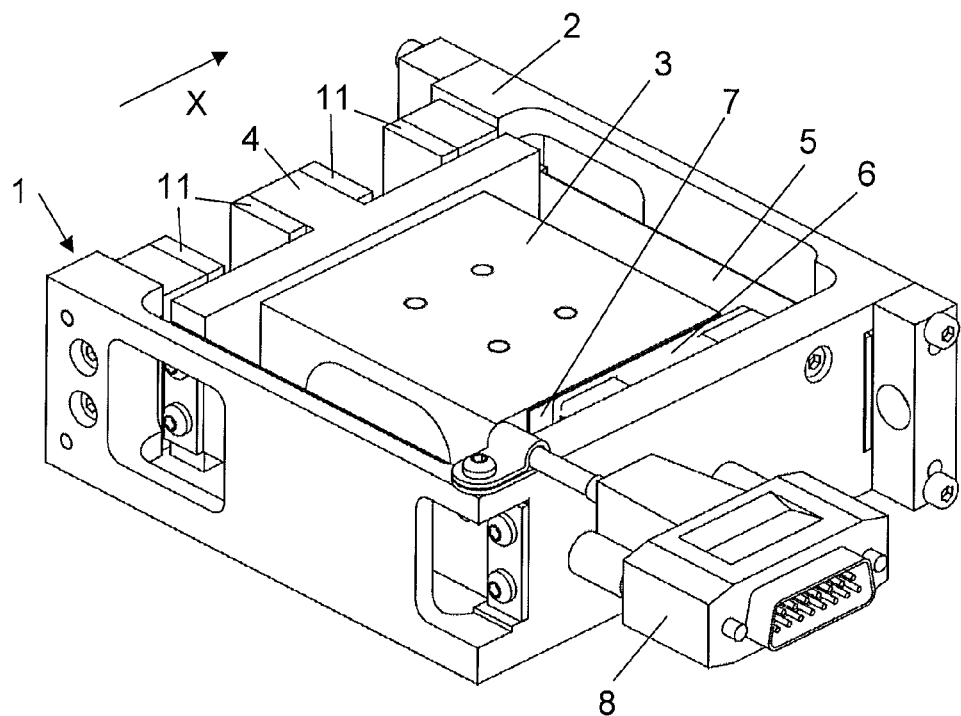
FIGS. 5 and 6 illustrate a vibration sensor according to a second exemplary embodiment of the present invention.
Figure 6:
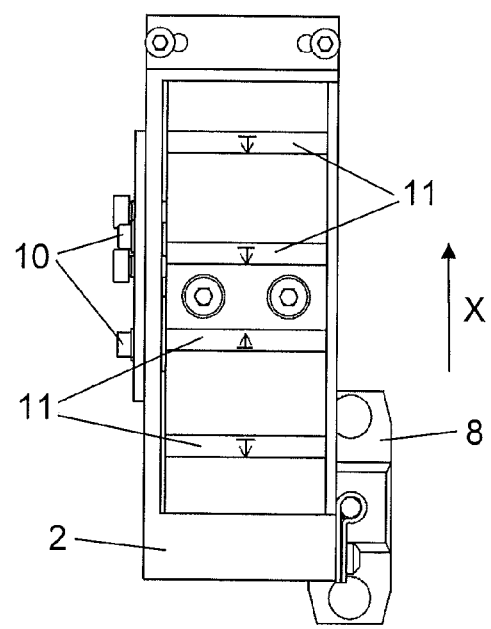

FIGS. 5 and 6 illustrate a second exemplary embodiment of vibration sensor 1 which is suitable for vertical installation, e.g., for a vibration sensor that measures vibrations in the vertical direction. The structure of this vibration sensor substantially corresponds to that of the first exemplary embodiment. Corresponding components such as frame 2, mass block 3, and leaf springs 5 are provided with the same reference numerals as in the first exemplary embodiment, and are not explained again.

Due to the vertical installation, leaf springs 5 are not—like previously in the horizontally installed vibration sensor—subjected to pressure by the weight force of mass block 3 (buckling mode). Rather, the weight force acts in measuring direction X, and leaf springs 5 are thus bent (bending mode). Because of this, the natural frequency of vibration sensor 1 increases somewhat. However, like before, at least a portion of the weight force of mass block 3 may be offset by the leaf springs.

As explained above, however, since a low resonant frequency of vibration sensor 1 is advantageous, the softest possible leaf springs 5 are used, which could possibly be bent too greatly by the weight force of mass block 3. Therefore, in the configuration of this second exemplary embodiment of a vibration sensor 1 for vertical installation (in the sense of a measurement of the vibration in the vertical direction), magnets 11 are mounted on frame 2 and, with the aid of T-shaped mount 4, on mass block 3, and are aligned relative to each other such that they are able to compensate for at least a portion of the weight of mass block 3. Two magnet pairs are provided for this purpose, the magnet pair lying at the bottom in the vertical direction being aligned such that the two magnets 11 repel each other, while the magnet pair lying at the top attract each other. Both magnet pairs are thus able to compensate at least partially for the gravitational force of mass block 3. Softer leaf springs 5 may therefore be used, and the mechanical resonant frequency of vibration sensor 1 is able to be kept, low.

An advantage of the configuration of two magnet pairs is that the additional magnetic spring constant of the two repelling magnets 11 at the bottom, which must be added to the spring constants of leaf springs 5 and which would increase the resonant frequency of vibration sensor 1, is able to be offset by a negative magnetic spring constant of the magnet pair at the top. By a suitable selection or the air gaps between magnets 11, the strength of magnets 11, and the spring constants of leaf springs 5, it is possible to produce a vertical vibration sensor 1 having a low resonant frequency. Vibration sensor 1 for measuring vertical vibrations may be constructed wish the same leaf springs 5 as the vibration sensor of the first exemplary embodiment, which is suitable for measuring horizontal vibrations.

In order to take into account she variance—existing in any mass production—of the properties of the components used, a possibility should be provided for calibrating the vibration sensor. Thus, the vertical position of at least one of magnets 11 may be adjustable, e.g., a magnet 11 secured on frame 2. For instance, this could be accomplished with the aid of screws. In this manner, the spacing of a magnet pair may be altered. Despite fluctuations in the strength of magnets 11 used and the mass of mass block 3, vibration sensor 1 may be adjusted such that magnets 11 compensate exactly for the gravitational force of mass block 3, and that mass block 3 therefore lies precisely in the middle of its motion range when in its position of rest.

An alternative to the exemplary embodiment illustrated in FIGS. 5 and 6 is to dispense with the repelling magnet pair at the bottom, and instead, to use somewhat stronger leaf springs 5. The spring constant somewhat increased in this manner is then offset by the magnet pair at the top having negative magnetic spring constant, so that a vibration sensor 1 having sufficiently low resonant frequency may be constructed in this manner, as well.

One or more pairs of attracting magnets 11 having a negative magnetic spring constant may also be added to the first exemplary embodiment of a vibration sensor 1 for horizontal vibrations and contribute to an overall lower spring constant, and therefore lower resonant frequency of the vibration sensor.

Based on its mechanical properties, the vibration sensors described herein are particularly suitable for use in measuring and active attenuation of the vibration of a platform, the signals of the vibration sensor being utilized to control the actuators for the active damping of the platform. The resonant frequencies of such platforms, lying typically in the range of a few Hertz, are able to be detected very well wish the vibration sensors described herein, since their own resonant frequencies still lie below that.

The use of the vibration sensors described herein for measuring the imbalance of a rotating shaft of a machine tool also presents itself, since similarly low frequencies can be expected and detected, and since the vibration sensor has an interface standardized for position-measuring devices, as are used in many cases on machine tools. The vibration sensors may therefore be connected without difficulty to customary numerical controls.

As a rule, a turned workpiece is not clamped exactly centrally on the rotary table of a turning milling machine. Therefore, prior to the machining by turning, the size and orientation angle of the eccentric mass of workpiece and clamping device must be ascertained and compensated for by correction masses. The rotary table must be balanced. To that end, the vibration sensor is secured at a suitable location on the machine frame or swiveling table of a rotating-swiveling table. Transverse forces that occur are absorbed in the vibration sensor by leaf springs 5, which lead mass block 3 in the measuring direction, and otherwise block all degrees of freedom.

The signal quality in terms of noise is better compared to a conventional piezo sensor, which gives reason to expect high accuracy of the balancing result.

What is claimed is:

1. A vibration sensor, comprising:
  a frame;
  at least one spring;
  a mass block supported with the aid of the at least one spring in a manner allowing movement relative to the frame in a measuring direction;
  a position-measurement device adapted to detect a displacement of the mass block in the measuring direction relative to the frame, the position-measurement device including a measuring standard and a scanning head aligned with the measuring standard, a first one of the measuring standard and the scanning head being secured on the mass block, a second one of the measuring standard and the scanning head being secured on the frame.

2. A vibration sensor, comprising:
a frame;
at least one spring;
a mass block supported with the aid of the at least one spring in a manner allowing movement relative to the frame in a measuring direction;
a position-measurement device adapted to detect a displacement of the mass block in the measuring direction relative to the frame, the position-measurement device including a measuring standard and a scanning head aligned with the measuring standard, a first one of the measuring standard and the scanning head being secured on the mass block, a second one of the measuring standard and the scanning head being secured on the frame;
wherein the mass block is retained by two leaf springs in a manner allowing movement relative to the frame in measuring direction and blocking movement in all other degrees of freedom of the mass block.

3. The vibration sensor according to claim 1, wherein the measuring standard is disposed on the mass block, and the scanning head is disposed on the frame.

4. The vibration sensor according to claim 1, wherein the scanning head is adapted to scan the measuring standard with the aid of light.

5. The vibration sensor according to claim 1, further comprising at least one damping magnet adapted to damp movement of the mass block by an eddy-current braking.

6. The vibration sensor according to claim 5, wherein damping magnets of different magnetic alignment are disposed on the mass block and are aligned with an electrically conductive wall of the frame.

7. The vibration sensor according to claim 1, wherein the measuring direction has a component in a direction of the gravitational force, at least a portion of the gravitational force of the mass block being offset by a configuration of magnets.

8. The vibration sensor according to claim 7, wherein at least two magnets are secured on the frame and on the mass block such that the gravitational force on the mass block is offset at least partially by an attractive force between the magnets.

9. The vibration sensor according to claim 7, wherein one pair of the magnets is adapted to compensate partially for the gravitational force on the mass block with the aid of a repelling force, and a further pair of the magnets is adapted to compensates partially for the gravitational force on the mass block with the aid of an attractive force.

10. The vibration sensor according to claim 7, wherein a vertical position of at least one of the magnets is adjustable.

11. The vibration sensor according to claim 1, wherein a portion of the gravitational force on the mass block not compensated for by the magnets is compensated for by an excursion of the leaf springs and a resultant spring force.

12. The vibration sensor according to claim 1, wherein the vibration sensor is adapted to be mounted on a platform and measure vibrations of the platform, signals of the vibration sensor being adapted for active attenuation of the vibrations of the platform.

13. The vibration sensor according to claim 1, wherein the vibration sensor is adapted to measure an imbalance of a rotating shaft of a machine tool.

14. A method, comprising:
measuring, with the vibration sensor according to claim 1, vibrations of a platform on which the vibration sensor is mounted; and
actively attenuating the vibrations of the platform in accordance with signals of the vibration sensor.

15. A method, comprising:
measuring, with the vibration sensor according to claim 1, an imbalance of a rotating shaft of a machine tool.

* * * * *